(No Model.)
F. B. AUSTIN.
AMALGAMATOR.
No. 563,119. Patented June 30, 1896.
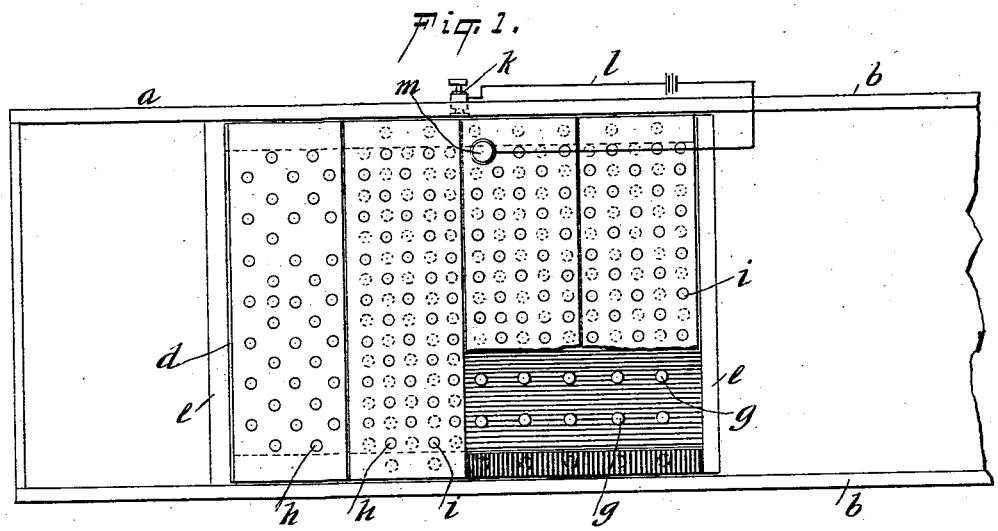
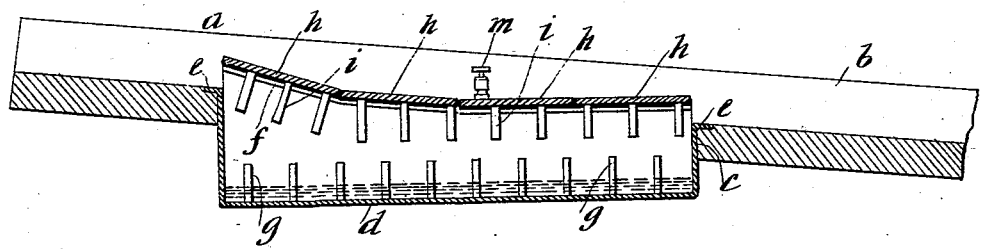
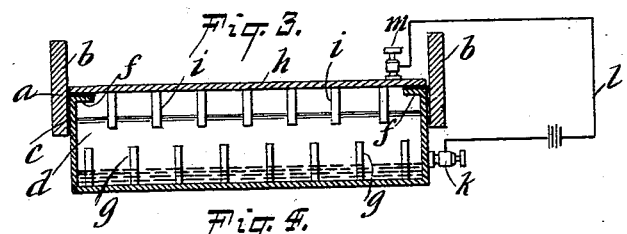
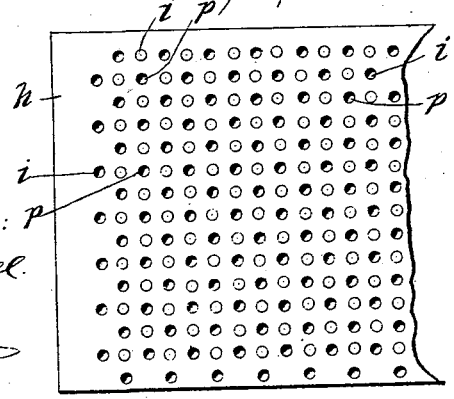
WITNESSES:
William P. Goebel.
Isaac B. Owens.
INVENTOR
F. B. Austin.
BY
Munn & Co
ATTORNEYS.

UNITED STATES PATENT OFFICE.

FRANCIS B. AUSTIN, OF TEMPE, ARIZONA TERRITORY.

AMALGAMATOR.

SPECIFICATION forming part of Letters Patent No. 563,119, dated June 30, 1896.

Application filed June 4, 1895. Serial No. 551,677. (No model.)

*To all whom it may concern:*

Be it known that I, FRANCIS B. AUSTIN, of Tempe, in the county of Maricopa and Territory of Arizona, have invented a new and Improved Amalgamator, of which the following is a full, clear, and exact description.

This invention relates to an improvement in amalgamating apparatus of that class wherein currents of electricity are applied to the amalgamating-plates, so as to assist in the attraction and detention of the fine particles of gold; and the object of the invention is to provide an apparatus in which the saving of gold will be more effective than heretofore, and which will operate by an improved arrangement of amalgamating-plates and mercury-receiving pan.

To this end the invention consists in certain novel features of construction and combination and arrangement of parts, as will be fully described hereinafter, and finally embodied in the claims.

Reference is to be had to the accompanying drawings, forming a part of this specification, in which similar characters of reference indicate corresponding parts in all the figures.

Figure 1 represents a plan view of a sluice to which my improvement is applied and showing a part thereof in section. Fig. 2 is a vertical longitudinal section on the line 2 2 in Fig. 1 and through the amalgamator. Fig. 3 is a vertical cross-section, also taken through the amalgamator; and Fig. 4 is a plan view of a modification.

The reference-letter $a$ indicates a gold-sluice of the ordinary construction, which comprises a bottom having sides $b$ projecting upwardly therefrom, and serving to make the sluice capable of containing the pulp and water which passes through it. Formed in the bottom of the sluice $a$ and occupying the whole width thereof is an opening $c$, which is rectangular in form and which is adapted to receive the pan $d$, the said pan being disposed horizontally, constructed of copper, and having at its ends flanges $e$, which are let into the upper sides of the bottom $a$ and which serve to support the pan. The upper edges of the sides of the pan $d$ are formed with inwardly-extending and horizontal flanges $f$, which are one for each side, and which are alined with the flanges $e$.

$g$ indicates a series of spikes or rods which are rigidly secured to the bottom of the pan $d$, and which project upwardly therefrom, the spikes being about one-half as high as the lowest upper edge of the pan $d$.

Rested upon the flanges $f$ of the pan $d$ are four horizontally-disposed plates $h$, which are extended transversely and which have secured to their lower sides and projecting downwardly therefrom the spikes $i$. The plates $h$ are arranged so that they will curve gradually upward from the lower end of the pan, whereby the front edge of the highest plate is raised above the high edge of the pan $d$. These spikes $i$ are similar to the spikes $g$ of the pan $d$ and project downwardly into the pan, but are above said spikes $g$ and therefore not in actual contact with them or with the pan $d$. The upper sides of the flanges $f$ are provided with any suitable insulating material, whereby electrical contact between the plates $h$ and the flanges is avoided.

The reference-letter $k$ indicates a binding-post, which is mounted on the pan $d$ and which has the line $l$ in electrical connection therewith. Fixed to one of the plates $h$ is a second binding-post $m$, which is similar to the post $k$, and which is also in electrical connection with the wire $l$. The circuit formed by the wire $l$ is energized by any suitable generator, as indicated in Figs. 1 and 3, and it will be seen that the circuit is normally open, since there is no direct electrical connection between the pan $d$ and the plates $h$. It will be understood that the plates $h$ make contact with each other, and such as is capable of permitting a passage of the current through them.

Located within the pan $d$ is a quantity of mercury $o$, and this mercury is so arranged that the bases of the spikes $i$ will be submerged therein, but the mercury does not rise to the spikes $g$. When the charge is thus assembled, the current of the circuit $l$ will pass the plates $h$ to the pan $d$, so that gold particles passing through the pan will be retained by the spikes $g$ and $i$, as is well understood in the art of gold mining and working.

Fig. 4 illustrates a modified form of the plates $h$, and this consists in forming in the plates a series of perforations $p$, which are arranged closely throughout the plate and which are adapted to have the gold and pulp passed through them on their way into the pan *d*. In the said figure the letters *i* indicate the spikes of the plates, which are secured therein, as shown, while the letter *p* refers to the perforations. When this form of plate is employed, the end plates will not be raised above the pan *d*, as shown in Fig. 2, but will lie directly upon the same and the pulp and gold will enter the pan through the perforations. By this arrangement the pulp and gold are effectively distributed throughout the pan.

Having thus described my invention, I claim as new and desire to secure by Letters Patent—

1. The combination with an inclined sluice having an opening therein, of a pan arranged in said sluice and having a horizontal bottom, spikes arising from the bottom of the pan, a cover-plate for the pan, the same being rested on and insulated from the pan and curved upwardly and forwardly and having its front and rear edges raised above the pan, spikes secured to the under side of the plate and projecting downwardly toward the first spikes, and means for electrically charging the pan and plate, substantially as described.

2. The combination with an inclined sluice having an opening therein, of a pan arranged in said opening and having a horizontal bottom, a cover-plate held above and insulated from the pan, spikes respectively projecting from the bottom of the pan and from the under side of the cover-plate, and means for electrically charging the pan and cover-plate, substantially as described.

3. The combination with a sluice having an opening therein, of a pan arranged in said opening and having inwardly-extending and horizontal flanges at its sides, a cover-plate rested on said flanges, the plate being insulated from the pan, spikes respectively projecting from the plate and pan, and means for electrically charging said plate and pan, substantially as described.

4. The combination with an inclined sluice having an opening therein, of a pan having its front and rear edges provided with outwardly-projected flanges let into the sluice, the pan being seated in an opening in the sluice and also having at its sides inwardly-projecting flanges, spikes rising from the bottom of the pan, a series of cover-plates extended transversely and rested on the side flanges of the pan, the sides of the pan being curved upwardly and forwardly, spikes projecting from the under sides of the cover-plates, and means for electrically charging the cover-plates and the pan, substantially as described.

FRANCIS B. AUSTIN.

Witnesses:
   JAMES B. LACY,
   R. H. UPTON.